Oct. 1, 1935.  J. A. WATT  2,015,773

APPARATUS FOR MAKING SHEET GLASS

Filed June 15, 1934  4 Sheets-Sheet 1

INVENTOR
John A. Watt
BY Bradley & Bee
ATTORNEYS

Oct. 1, 1935.　　　　　J. A. WATT　　　　　2,015,773
APPARATUS FOR MAKING SHEET GLASS
Filed June 15, 1934　　　4 Sheets-Sheet 2
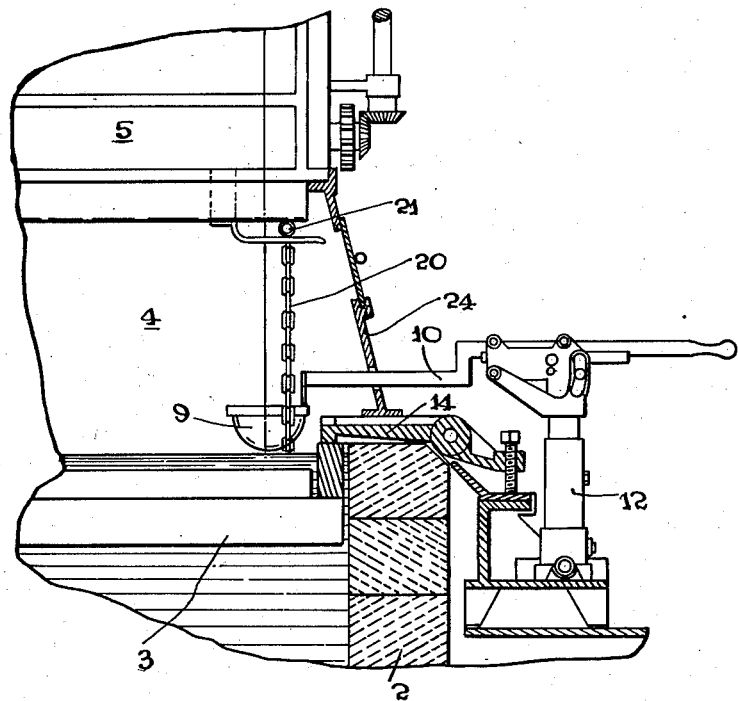
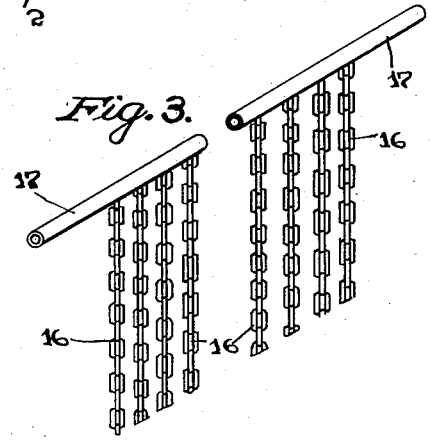
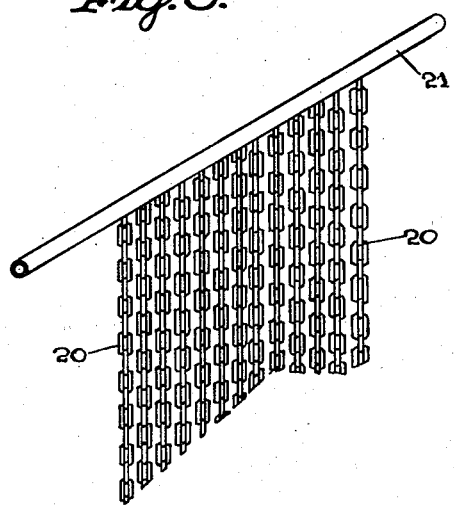
INVENTOR
John A. Watt
BY
ATTORNEYS Oct. 1, 1935.  J. A. WATT  2,015,773
APPARATUS FOR MAKING SHEET GLASS
Filed June 15, 1934  4 Sheets-Sheet 3

INVENTOR
John A. Watt
BY
Bradley & Bee
ATTORNEYS

Oct. 1, 1935.   J. A. WATT   2,015,773
APPARATUS FOR MAKING SHEET GLASS
Filed June 15, 1934   4 Sheets-Sheet 4
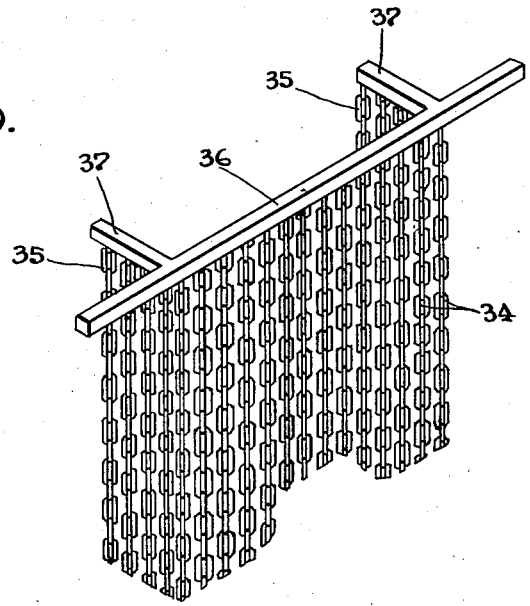
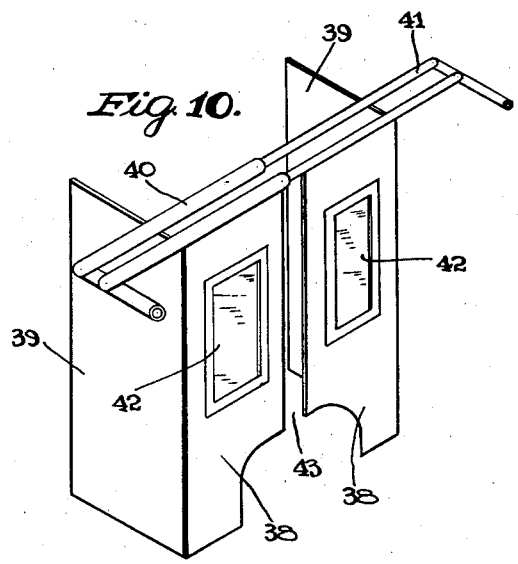
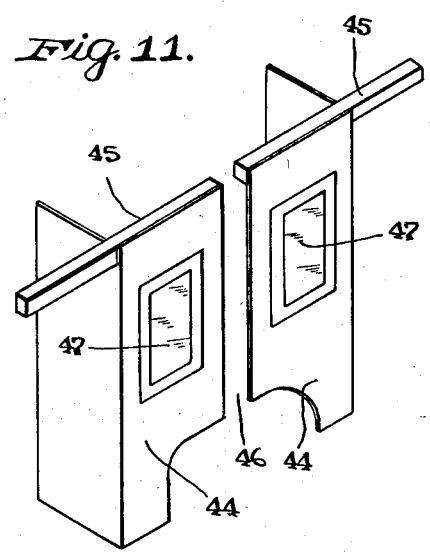
INVENTOR
John A. Watt.
BY
ATTORNEYS Patented Oct. 1, 1935

2,015,773

UNITED STATES PATENT OFFICE 2,015,773

APPARATUS FOR MAKING SHEET GLASS

John A. Watt, Clarksburg, W. Va., assignor to Pittsburgh Plate Glass Company, a corporation of Pennsylvania Application June 15, 1934, Serial No. 730,732

9 Claims. (Cl. 49—17)

Figure 1:
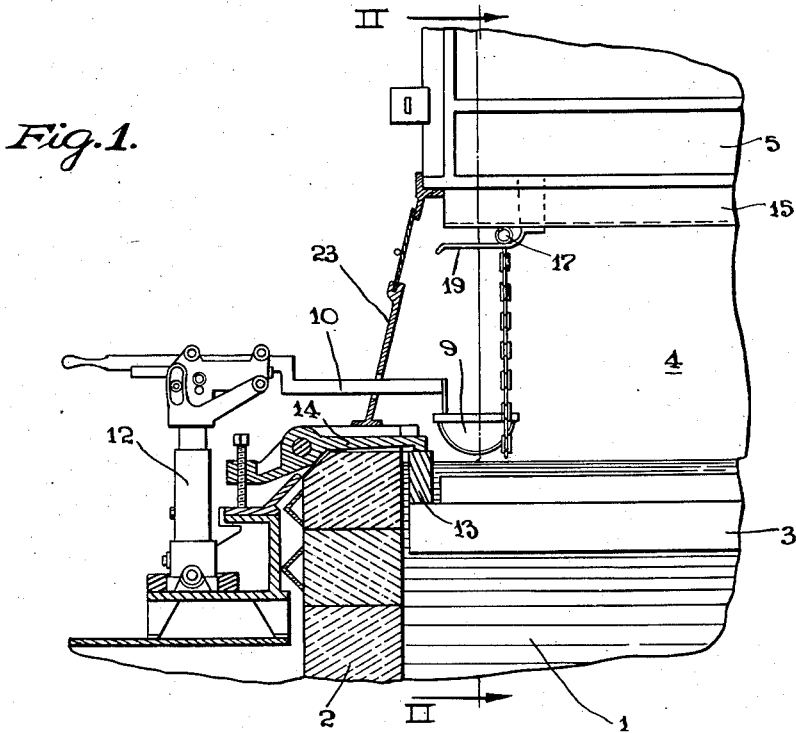
Figure 2:
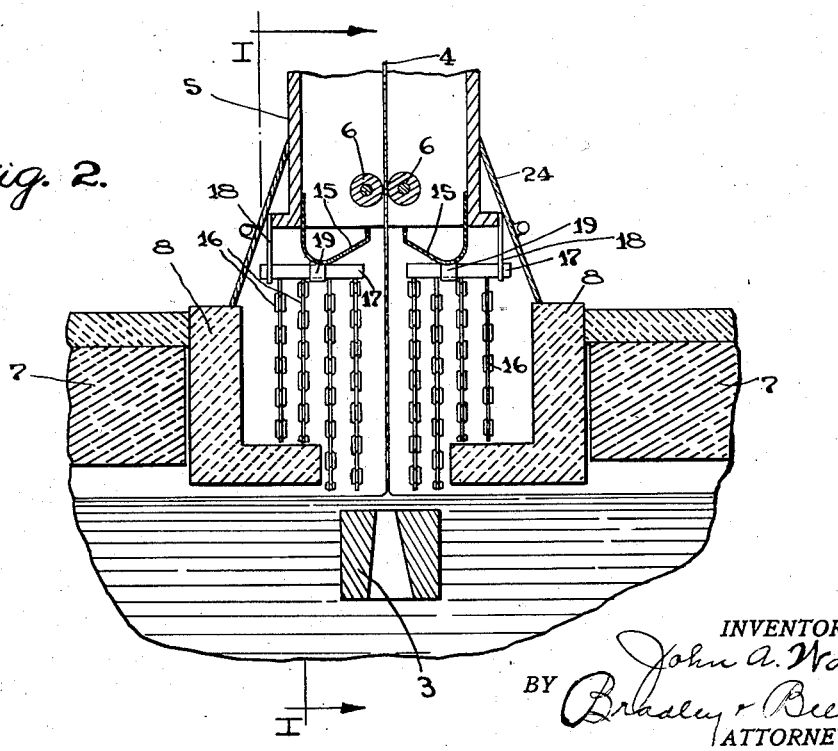

The invention relates to apparatus for drawing sheet glass by the Slingluff process, and has for its object the provision of means intermediate the leer and the glass bath to insure a better annealing of the glass. Heretofore, in cutting glass made in accordance with the Slingluff process, it has been found that the glass inward from the edge of the sheet for a distance of five or six inches is somewhat too hard for satisfactory cutting, and considerable loss in cutting results from this condition. The present invention overcomes this difficulty to a large extent. The extreme border parts of the sheet extending in from two to three inches are necessarily highly tempered and hard, or buckling of the sheet will occur, and such edges must in all cases be trimmed off before cutting the sheet sections into their desired commercial sizes, but due to the expedient set forth herein, the hardness of the sheet inside such trimmed off edges is reduced to a point approximating that of the body of the sheet, so that when a strip of about three inches in width is trimmed off, the balance of the sheet can be cut clear up to its edges without loss. Certain embodiments of the invention are illustrated in the accompanying drawings, wherein:

Figure 1 is a vertical section on the line I—I of Fig. 2. Fig. 2 is a section on the line II—II of Fig. 1. Fig. 3 is a perspective view of a detail of construction. Fig. 4 is a vertical section similar to that of Fig. 1, but illustrating a modification. Fig. 5 is a perspective view showing a detail of construction of the apparatus of Fig. 4. And Figs. 6 to 11 are detail perspective views illustrating modifications.

Referring to the construction of Figs. 1, 2 and 3, 1 is a molten bath of metal carried by the drawing tank or extension 2, a draw bar 3 being mounted in the tank beneath the line of draw of the sheet 4. Mounted above the bath is a leer of the Fourcault type including the casing 5 and the pairs of driven rollers 6 which yieldingly engage the opposite sides of the glass sheet and provide for continuous drawing operation, the glass sheet being cut into sections in the usual way as it emerges from the top of the leer. The tank is provided with the usual cover blocks 7 and the L blocks 8, 8 whose lower flanges are relatively close to the surface of the glass and spaced apart to expose the surface of the bath adjacent the line of draw to the cooling action of the atmosphere. The width of the sheet is maintained by the slotted edge bowls 9 which are carried by the lever arms 10 mounted upon the standards 12 so as to provide for the adjustment of the edge bowls to any desired position. The draw bar 3 is held in submerged position by means of the blocks 13 engaged at their upper edges by means of the levers 14. The lower end of the leer casing is provided with the metal closing plates 15. The structure as thus far described is old and well known in the art.

The improvement herein consists in the provision of openwork metal shields or curtains at each or either side of the drawing tank, such shields or curtains being preferably made up of the series of lengths of chain 16 secured at their upper ends to the bars 17 and extending down so that their lower ends are in close proximity to the molten bath of glass or to the flanges of the L blocks 8, 8. The bars 17 are each supported at one end by a hanger 18 and at their middle portions by the clips 19 (Fig. 1) welded to the plates 15, 15. As indicated in Fig. 1, the chains 16 are positioned inward of the edges of the glass sheet 4, so that the edges of the sheet lie about 2 inches outside the chain curtain. In the operation of a furnace of this kind, there is a circulation of air inward through the peep holes in the shields or doors 23 carried thereby and through other smaller leakage openings, the draft thus admitted going directly to the bath of molten metal with the larger portion going to the tank side of the sheet. The chain curtains break up the force of this draft giving a more uniform distribution of the air to the front and rear of the sheet and eliminating a direct flow to the sheet gather. Thus the entire sheet sets more evenly and gives a more uniform cutting condition. The chains, due to their position above the molten bath, become highly heated, and thus raise the temperature of the air as it passes the chain curtains. Its cooling effect upon the side portions of the sheet is, therefore, materially reduced. As a result, the body of the sheet lying inside the chain curtains is soft enough to be readily cut clear up to the point at which the edges are trimmed off. The portions of the sheet lying outside the chain curtains are not greatly affected thereby, which is a desirable condition as otherwise if the edges were heated and softened to too great an extent, there would be a tendency of the edges to give and cause a buckling in the sheet.

Figs. 4 and 5 illustrate a modification which differs principally from that of Figs. 1, 2 and 3 in that the chains 20 constituting the curtains are positioned outside the edges of the sheet 4. In this case, the chains are supported upon a single bar 21 instead of upon the two bars as in the construction of Figs. 1, 2 and 3. The bar in turn is supported upon hangers and clips similar to the hangers and clips heretofore described. This construction accomplishes the same general object as that of the first described construction, but is less desirable as in some instances the edges of the glass sheet formed are not sufficiently rigid. In this construction, as well as that of Figs. 1 to 3, shields 23 and 24 are employed to keep currents of air away from the glass sheet, but due to leakage, and to the use of peep holes, these are not entirely effective, so that the damaging chilling of the sheet as heretofore explained occurs unless the additional chain curtains or their equivalents are employed.

Figure 6:
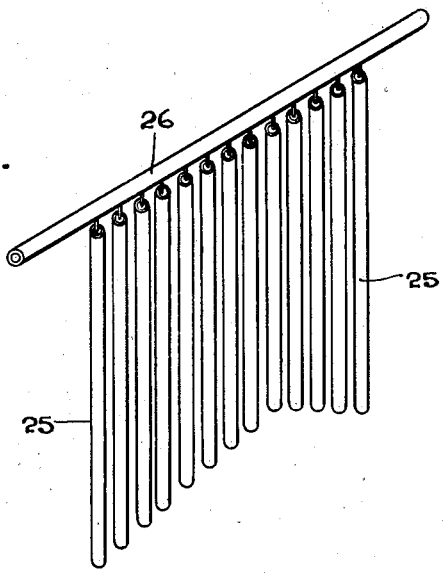

In the construction of Fig. 6, the parallel metal bars 25 are substituted for the chains, such bars being supported upon transverse bars 26 corresponding to the bars 17 and 21 of the constructions of Figs. 1 and 4.

Figure 7:
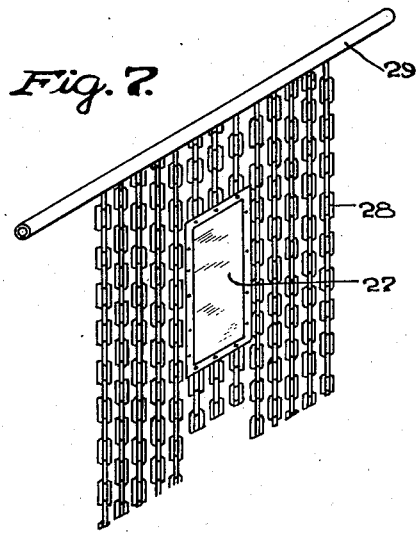

Fig. 7 illustrates a construction similar to that of Fig. 5 except that the chain curtain is provided with a window 27 to permit observation of drawing conditions inside the curtain, such window being preferably made of heat resisting glass. The chains 28 are supported upon a bar 29 corresponding to the bar 21 of the Fig. 5 construction.

Figure 8:
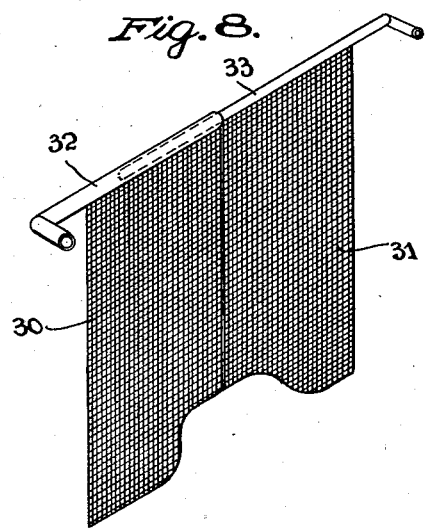

In the construction illustrated in Fig. 8, the curtain is made up of a pair of metal screens 30 and 31 secured to the telescoping rods 32 and 33. The function performed here is the same as that performed by the chain curtains and the use of the telescopic supporting rods permits the sections 30 and 31 to be separated, so as to adjust the cooling effect of the air upon the edge of the glass sheet, and to permit observation of such edge; also to permit the insertion of tools for acting upon the glass when occasion arises.

Fig. 9 illustrates a construction in which the main curtain or shield 34 is supplemented by a pair of side curtains 35, 35, the chains being supported upon a bar 36 which is provided with extensions 37, 37 for supporting the curtains 35, 35.

In the construction of Fig. 10, the curtains are made up of the sheet metal members 38, 38 having the wings 39, 39 and supported upon the telescoping rods 40 and 41. The plates 38, 38 are provided with the windows 42, 42 for inspection purposes, and in operation, the two shields will ordinarily be separated so that the slot 43 is formed permitting more cooling of the edge of the glass sheet than would otherwise be the case.

Fig. 11 illustrates a modification of the Fig. 10 construction wherein the shields 44, 44 are supported on the rods 45, 45 spaced so that the edge of the glass sheet can project through the slot 46 for giving additional cooling of the edge the same as in the construction of Fig. 1. The shields are provided with windows 47, 47.

What I claim is:

1. In combination with glass drawing apparatus including a vertical leer having its lower end spaced above a body of molten glass in a drawing tank and having means therein for drawing a glass sheet continuously therethrough, a flat vertical metal shield at each side of the leer between the leer and the glass bath each lying in a plane at right angles to the plane of the glass sheet being drawn, each shield having an opening at its central portion in line with the plane of the glass sheet whereby the sheet edges are exposed to the cooling action of the atmosphere outward of the shields.

2. In combination with glass drawing apparatus including a vertical leer having its lower end spaced above a body of molten glass in a drawing tank and having means therein for drawing a glass sheet continuously therethrough, a metal shield at each side of the leer between the leer and the glass bath, each shield comprising an openwork curtain, having a slot at its central portion in line with the plane of the glass sheet being drawn.

3. In combination with glass drawing apparatus including a vertical leer having its lower end spaced above a body of molten glass in a drawing tank and having means therein for drawing a glass sheet continuously therethrough, a metal shield at each side of the leer between the leer and the glass bath, each shield comprising a chain curtain having an opening at its center in opposition to the edge of the glass sheet being drawn.

4. In combination with glass drawing apparatus including a vertical leer having its lower end spaced above a body of molten glass in a drawing tank and having means therein for drawing a glass sheet continuously therethrough, a metal shield at each side of the leer between the leer and the glass bath, each shield comprising a plurality of lengths of chain spaced apart.

5. In combination with glass drawing apparatus including a vertical leer having its lower end spaced above a body of molten glass in a drawing tank and having means therein for drawing a glass sheet continuously therethrough, a flat vertical metal shield at each side of the leer between the leer and the glass bath in a plane at right angles to the plane of the sheet being drawn, each shield comprising a plurality of elongated metal members spaced apart on each side of the plane of the sheet.

6. In combination with glass drawing apparatus including a vertical leer having its lower end spaced above a body of molten glass in a drawing tank and having means therein for drawing a glass sheet continuously therethrough, a vertical metal shield at each side of the leer between the leer and the glass bath in a plane at right angles to the plane of the glass sheet being drawn, each shield having an opening at its central portion in line with the plane of the glass sheet, and positioned so that the edge of the sheet projects through the opening and lies on the outer side of the shield.

7. In combination with glass drawing apparatus including a vertical leer having its lower end spaced above a body of molten glass in a drawing tank and having means therein for drawing a glass sheet continuously therethrough, a vertical metal shield at each side of the leer between the leer and the glass bath in a plane at right angles to the plane of the sheet being drawn, each shield comprising a plurality of elongated metal members spaced apart and positioned so that in the drawing operation the edge of the glass sheet projects through one of the spaces between the members and lies on the outer side of the shield.

8. In combination with glass drawing apparatus including a vertical leer having its lower end spaced above a body of molten glass in a drawing tank and having means therein for drawing a glass sheet continuously therethrough, a metal shield at each side of the leer between the leer and the glass bath, each shield comprising an openwork curtain having a slot at its central portion in line with the plane of the glass sheet being drawn and positioned so that in the drawing operation the edge of the glass sheet projects through the slot.

9. In combination with glass drawing apparatus including a vertical leer having its lower end spaced above a body of molten glass in a drawing tank and having means therein for drawing a glass sheet continuously therethrough, a metal shield at each side of the leer between the leer and the glass bath, each shield comprising a plurality of lengths of chain spaced apart, and positioned so that in the drawing operation the edge of the glass sheet being drawn projects through one of the spaces between the lengths of chain.

JOHN A. WATT.